(12) United States Patent
Nikhil et al.

(10) Patent No.: US 11,550,625 B2
(45) Date of Patent: Jan. 10, 2023

(54) UTILIZING MACHINE LEARNING TO CONCURRENTLY OPTIMIZE COMPUTING RESOURCES AND LICENSES IN A HIGH-PERFORMANCE COMPUTING ENVIRONMENT

(71) Applicant: Accenture Global Solutions Limited, Dublin (IE)

(72) Inventors: Sharma Nikhil, El Dorado Hills, CA (US); Kamal Surana, Bangalore (IN); Srinivasan Viswanathan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 272 days.

(21) Appl. No.: 16/899,165

(22) Filed: Jun. 11, 2020

(65) Prior Publication Data

US 2021/0157642 A1    May 27, 2021

(30) Foreign Application Priority Data

Nov. 21, 2019    (IN) .............................. 201941047550

(51) Int. Cl.
| | |
|---|---|
| *G06F 9/44* | (2018.01) |
| *G06F 9/48* | (2006.01) |
| *G06N 5/02* | (2006.01) |
| *G06K 9/62* | (2022.01) |
| *G06F 21/10* | (2013.01) |
| *G06F 9/50* | (2006.01) |
| *G06N 5/00* | (2006.01) |

(52) U.S. Cl.
CPC .......... *G06F 9/4881* (2013.01); *G06F 9/5005* (2013.01); *G06F 21/105* (2013.01); *G06K 9/6256* (2013.01); *G06N 5/003* (2013.01); *G06N 5/025* (2013.01)

(58) Field of Classification Search
CPC ...................................................... G06F 9/4881
USPC ........................................................... 718/102
See application file for complete search history.

(56) References Cited

U.S. PATENT DOCUMENTS

2019/0258513 A1\*  8/2019  Poort ................... H04L 41/022
2019/0266014 A1    8/2019  Bahl et al.

OTHER PUBLICATIONS

Extended European Search Report for Application No. EP20202682.9, dated Mar. 31, 2021, 8 pages.

\* cited by examiner

*Primary Examiner* — Timothy A Mudrick
(74) *Attorney, Agent, or Firm* — Harrity & Harrity, LLP

(57) ABSTRACT

A device may receive a job request that requests performance of one or more operations by resources of a high-performance computing environment, and may process the job request, with a policy execution model trained with policy parameters, to identify policies to apply during execution of the job request. The device may process the job request, with a forecast object model trained with job data and profile data, to generate a forecast of resources and licenses required from the high-performance computing environment. The device may process the job request, other job requests, the one or more of the policies, and the forecast, with a heuristic model, to determine a schedule for the job request, and may process the schedule and current constraints on the resources and the licenses, with a linear programming model, to determine an optimized schedule for the job request.

20 Claims, 11 Drawing Sheets

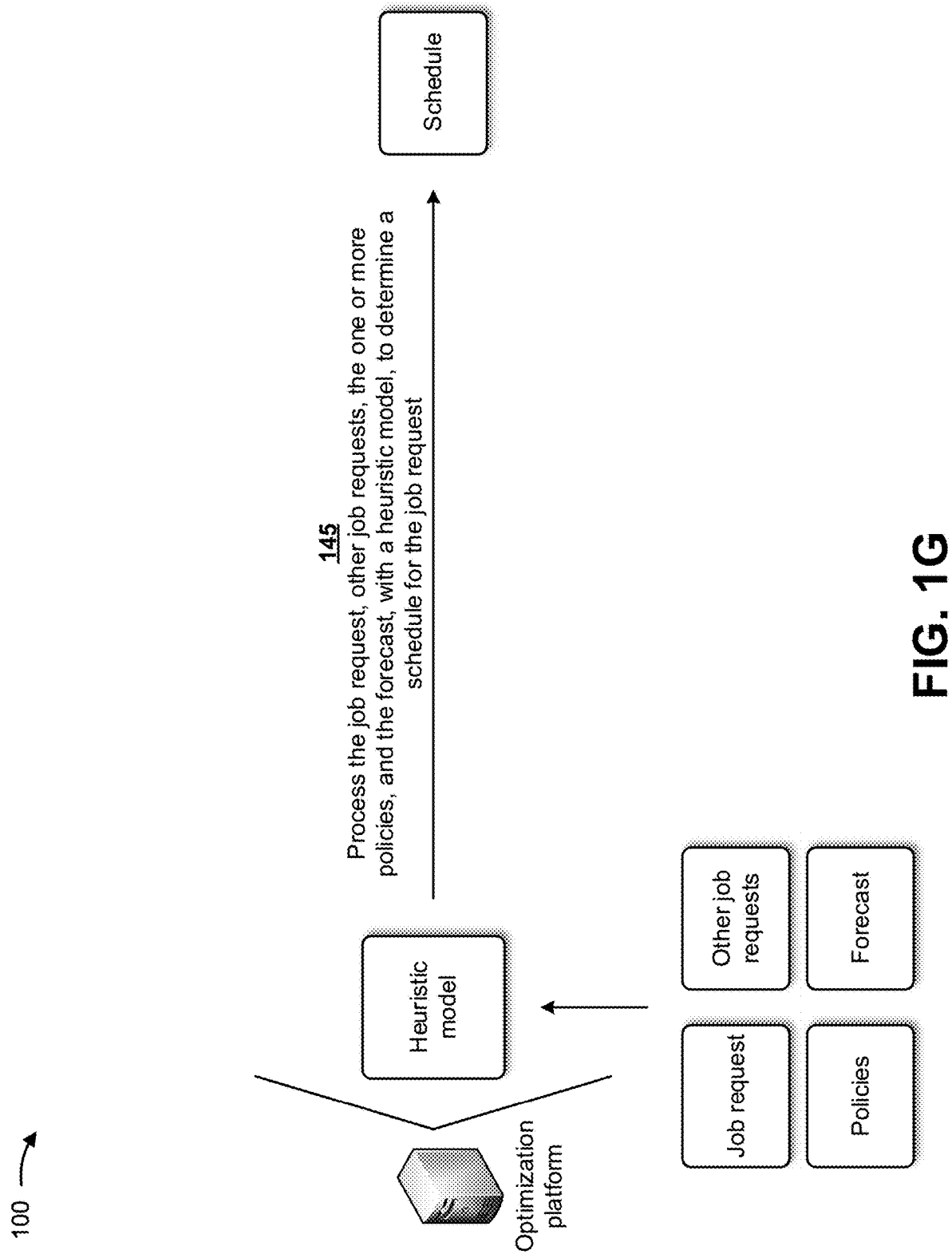

UTILIZING MACHINE LEARNING TO CONCURRENTLY OPTIMIZE COMPUTING RESOURCES AND LICENSES IN A HIGH-PERFORMANCE COMPUTING ENVIRONMENT

RELATED APPLICATION

This application claims priority to Indian Provisional Patent Application No. 201941047550, filed on Nov. 21, 2019, and entitled "SIMULTANEOUS LICENSE AND COMPUTE OPTIMIZATION IN HIGH PERFORMANCE COMPUTE ENVIRONMENT", the content of which is incorporated by reference herein in its entirety.

BACKGROUND

High-performance computing provides the ability to process data and perform complex calculations at high speeds, and may be employed to solve large problems in science, engineering, or business. A high-performance computing environment aggregates computing power (e.g., clusters of computers, processors, and/or the like) in a way that delivers much higher performance than is obtainable from a typical desktop computer or workstation.

SUMMARY

According to some implementations, a method may include receiving policy parameters for a policy execution model, and training the policy execution model with the policy parameters to generate a trained policy execution model and to generate policies for the trained policy execution model. The method may include receiving job data and profile data for a forecast object model, wherein the job data identifies data associated with executing jobs by a high-performance computing environment, and wherein the profile data identifies a historical profile associated with the high-performance computing environment, and training the forecast object model with the job data and the profile data to generate a trained forecast object model. The method may include receiving a job request that requests performance of one or more operations by resources of the high-performance computing environment, processing the job request, with the trained policy execution model, to identify one or more of the policies to apply during execution of the job request in the high-performance computing environment, and processing the job request, with the trained forecast object model, to generate a forecast of resources and licenses required from the high-performance computing environment. The method may include processing the job request, other job requests, the one or more of the policies, and the forecast, with a first model, to determine a schedule for the job request. The method may include processing the schedule and current constraints on the resources and the licenses of the high-performance computing environment with a second model to determine an optimized schedule for the job request relative to the schedule, and performing one or more actions based on the optimized schedule.

According to some implementations, a device may include one or more memories and one or more processors to receive a job request that requests performance of one or more operations by resources of a high-performance computing environment. The one or more processors may process the job request, with a policy execution model, to identify one or more policies to apply during execution of the job request in the high-performance computing environment, wherein the policy execution model is trained based on policy parameters. The one or more processors may process the job request, with a forecast object model, to generate a forecast of resources and licenses required from the high-performance computing environment, wherein the forecast object model is trained based on job data that identifies data associated with executing jobs by the high-performance computing environment, and profile data that identifies a historical profile associated with the high-performance computing environment. The one or more processors may process the job request, other job requests, the one or more policies, and the forecast, with a first model, to determine a schedule for the job request. The one or more processors may process the schedule and current constraints on the resources and the licenses of the high-performance computing environment, with a second model, to determine an optimized schedule for the job request relative to the schedule, and perform one or more actions based on the optimized schedule.

According to some implementations, a non-transitory computer-readable medium may store one or more instructions that, when executed by one or more processors of a device, may cause the one or more processors to train a policy execution model with policy parameters to generate a trained policy execution model and to generate policies for the trained policy execution model. The one or more instructions may cause the one or more processors to train a forecast object model with job data and profile data to generate a trained forecast object model, wherein the job data identifies data associated with executing jobs by a high-performance computing environment, and wherein the profile data identifies a historical profile associated with the high-performance computing environment. The one or more instructions may cause the one or more processors to receive a job request that requests performance of one or more operations by resources of the high-performance computing environment, and process the job request, with the trained policy execution model, to identify one or more of the policies to apply during execution of the job request in the high-performance computing environment. The one or more instructions may cause the one or more processors to process the job request, with the trained forecast object model, to generate a forecast of resources and licenses required from the high-performance computing environment. The one or more instructions may cause the one or more processors to process the job request, other job requests, the one or more policies, and the forecast, with a heuristic model, to determine a schedule for the job request. The one or more instructions may cause the one or more processors to process the schedule and current constraints on the resources and the licenses of the high-performance computing environment, with a linear programming model, to determine an optimized schedule for the job request relative to the schedule, and perform one or more actions based on the optimized schedule.

BRIEF DESCRIPTION OF THE DRAWINGS

FIGS. 1A-1I are diagrams of an example implementation described herein.

DETAILED DESCRIPTION

Figure 1A:
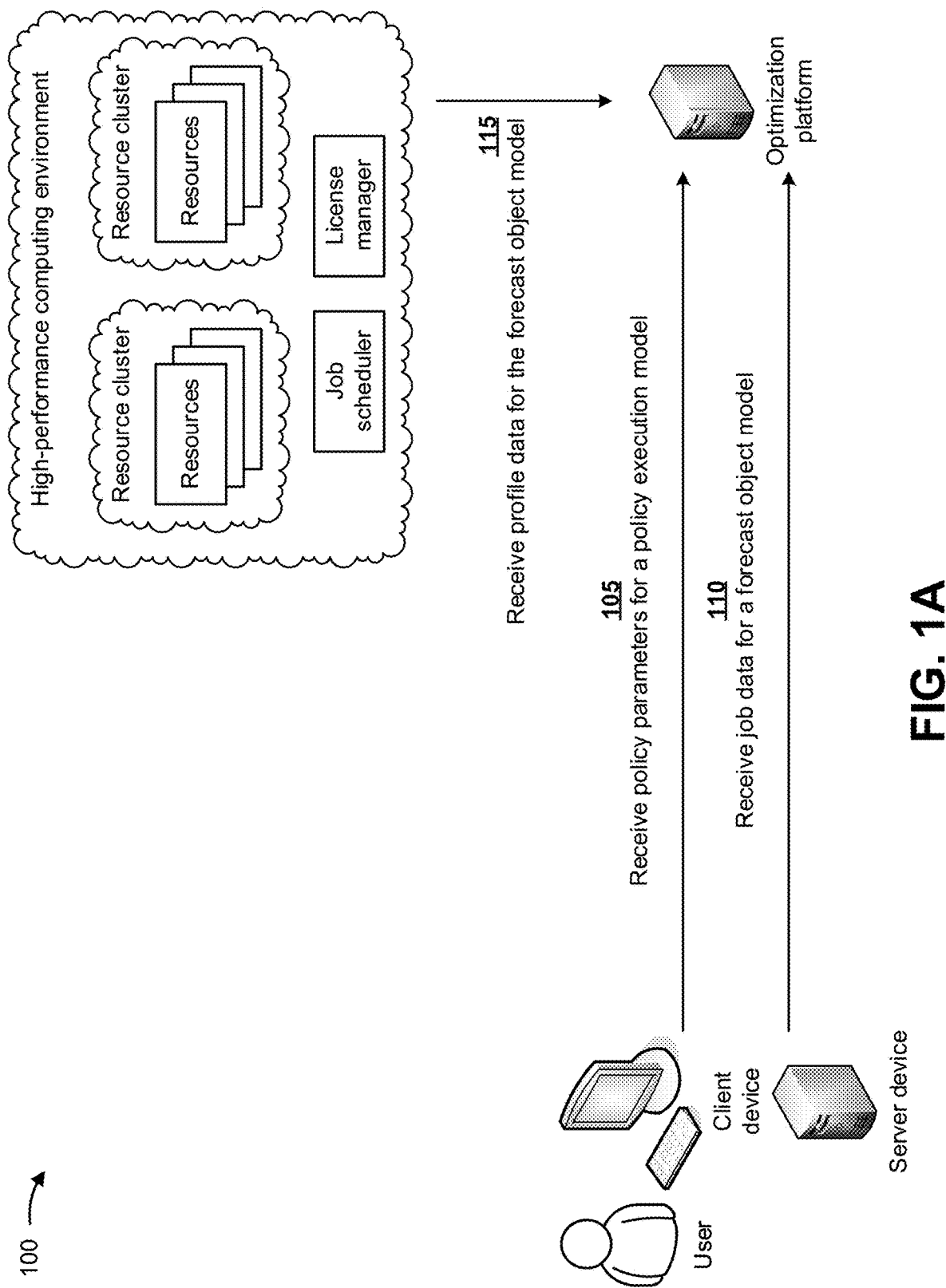

The following detailed description of example implementations refers to the accompanying drawings. The same reference numbers in different drawings may identify the same or similar elements.

A high-performance computing environment aggregates computing power in a way that delivers high performance (e.g., an ability to process data and perform complex calculations at high speeds). A high-performance computing environment may include at least one cluster of multiple computers, where each computer includes one or more processors, one or more memories, and/or the like. Each of the one or more processors may include a central processing unit (CPU), a graphics processing unit (GPU), an accelerated processing unit (APU), a quantum processing unit (QPU), and/or the like. Each cluster may be deployed in a local environment, a distributed environment, a cloud environment, and/or the like, and may include one or more physical machines, one or more virtual machines, and/or the like.

High-performance computing environments face a significant challenge in operating efficiently as a result of the increasing complexity and demands of high-performance computing applications. Optimization of these environments can be challenging due to the separate and independent nature of job scheduler(s) and license manager(s) of the high-performance computing environments. For example, a job scheduler may schedule an incoming job (e.g., a job may request 300 GB of memory and 8 processor cores, and the job scheduler may place the job on a computing host with at least 300 GB of memory and at least 8 processor cores). Thereafter, once the job has been placed on the computing host, the job may request a license from the license manager, which may assign the license. One problem in the high-performance computing environment is that, when scheduling a job via the above process, the job scheduler may not have correct information of whether a license will be available when requested from the license manager, which may lead to a license being denied. Another problem is that, when planning acquisition of resources and licenses, a different system may be used to plan for licenses than is used to plan for resources. This may lead to acquisition of fewer licenses or more licenses than will be needed, which cannot be easily detected and/or adapted to in the high-performance computing environment. Still another problem is that, when addressing conflicts (e.g., resources are available but a license is not) that can occur in the high-performance computing environment, a different system may be used to debug resource issues than is used to debug license issues, which may result in significant delays before the conflicts are resolved.

Thus, current techniques for optimizing resources and licenses waste computing resources (e.g., processing resources, memory resources, communication resources, etc.), human resources, and/or the like associated with job scheduling problems, design delays, and/or other problems that may result from resource conflicts, license conflicts, insufficient resource allocations, insufficient licenses, unavailable computing resources, unavailable licenses, and/or the like. Furthermore, current techniques for optimizing computing resources and licenses fail to improve throughput (e.g., jobs processed per unit of time), decrease costs (e.g., total cost of operation), and/or achieve an optimal throughput per cost ratio.

Some implementations described herein provide an optimization platform that utilizes machine learning to concurrently optimize resources and licenses in a high-performance computing environment. For example, the optimization platform may receive policy parameters for a policy execution model, and may train the policy execution model with the policy parameters to generate a trained policy execution model and to generate policies for the trained policy execution model. The optimization platform may receive job data and profile data for a forecast object model, and may train the forecast object model with the job data and the profile data to generate a trained forecast object model. The optimization platform may receive a job request that requests performance of one or more operations by resources of the high-performance computing environment, and may process the job request, with the trained policy execution model, to identify one or more of the policies to apply during execution of the job request in the high-performance computing environment. The optimization platform may process the job request, with the trained forecast object model, to generate a forecast of resources and licenses required from the high-performance computing environment. The optimization platform may process the job request, other job requests, the one or more of the policies, and the forecast, with a first model, to determine a schedule for the job request, and may process the schedule and current constraints on the resources and the licenses of the high-performance computing environment, with a second model, to determine an optimized schedule for the job request relative to the schedule. The optimization platform may perform one or more actions based on the optimized schedule.

In this way, the optimization platform utilizes machine learning to concurrently optimize resources and licenses in a high-performance computing environment. By generating an optimized schedule that concurrently optimizes both resources and licenses associated with requested jobs, the optimization platform enables execution of the jobs in a way that reduces resource conflicts, license conflicts, insufficient resource allocations, insufficient licenses, unavailable computing resources, unavailable licenses, and/or the like. This conserves computing resources (e.g., processing resources, memory resources, etc.) and/or the like that would otherwise have been wasted as a result of job failures and delays, that would otherwise be required to debug resource and license conflicts, and/or the like. Furthermore, by generating the optimized schedule, the optimization platform increases throughput, decreases costs, and/or increases a throughput per cost ratio.

FIGS. 1A-1I are diagrams of an example implementation 100 described herein. As shown in FIGS. 1A-1I, example implementation 100 includes a client device, a server device, an optimization platform, and a high-performance computing environment. The client device may be associated with a user (e.g., an operator associated with the high-performance computing environment), and may include a mobile device, a computer, and/or the like. The server device may include a server, such as, for example, an application server, a client server, a web server, a database server, a host server, a proxy server, a virtual server, a server in a cloud computing system, a device that includes computing hardware used in a cloud computing environment, or a similar type of device. The optimization platform may be hosted by a cloud computing environment, and may utilize machine learning to concurrently optimize resources and licenses in the high-performance computing environment. The high-performance computing environment may include one or more resource clusters, each having one or more resources, and may include at least one job scheduler and at least one license manager. The job scheduler may schedule incoming jobs (e.g., engineering jobs, design jobs, and/or the like) on an appropriate computing host based on resources (e.g., computing resources such as processors, memory, and/or the like) available. The license manager may assign available licenses (e.g., software licenses) to jobs, track usage of licenses utilized, and/or the like.

As shown in FIG. 1A, and by reference number 105, the optimization platform may receive policy parameters for a policy execution model. As will be explained with respect to FIG. 1B, the policy parameters may be used by the optimization platform to train the policy execution model to identify policies to apply during execution of a job request. The policy execution model may employ the policy parameters to generate rules that define the policies. As will be described in more detail below with respect to FIG. 1B, the policy parameters may define resources and licenses to which the rules apply, how the rules are classified, which rules apply to a job, and/or the like.

As further shown in FIG. 1A, and as shown by reference number 110, the optimization platform may receive job data for a forecast object model. The job data may be associated with jobs to be executed in the high-performance computing environment. As will be explained with respect to FIG. 1C, the job data may be used by the optimization platform to train the forecast object model to generate a forecast of resources and licenses required in the high-performance computing environment. As will be described in more detail below with respect to FIG. 1C, the job data may define resources and licenses to which the forecast applies, milestones and dates for jobs, and/or the like.

As further shown in FIG. 1A, and as shown by reference number 115, the optimization platform may receive profile data for the forecast object model. As will be explained with respect to FIG. 1C, the profile data may be used, in addition to the job data, to train the forecast object model to generate the forecast of resources and licenses required in the high-performance computing environment. As will be described in more detail below with respect to FIG. 1C, the profile data may include a historical profile that defines resources consumption, license consumption, rules applied, and/or the like by the high-performance computing environment.

Figure 1B:
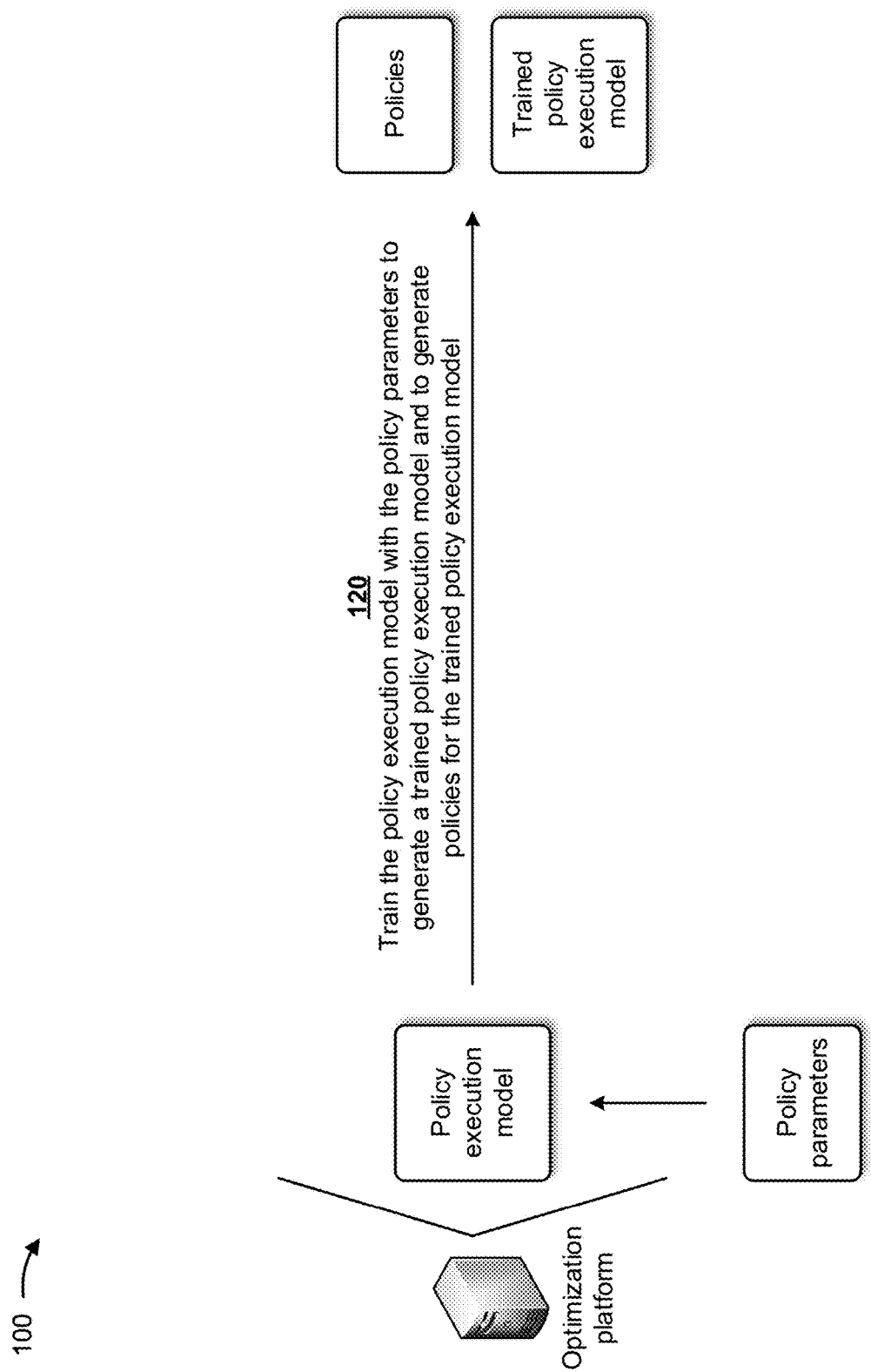

As shown in FIG. 1B, and by reference number 120, the optimization platform may train the policy execution model with the policy parameters to generate a trained policy execution model and to generate policies for the trained policy execution model. The optimization platform may train the policy execution model with historical data (e.g., historical policy parameters and/or the like) to generate the trained policy execution model. For example, the optimization platform may train the policy execution model in a manner similar to the manner described below in connection with FIG. 1H.

As will be described with respect to FIG. 1E, the trained policy execution model may identify one or more of the policies to apply during execution of the job request in the high-performance computing environment. The policy execution model may generate rules that define each of the one or more policies. The optimization platform may store the policies and/or rules in a rules engine. In some implementations, the trained policy execution model may be implemented by a resource orchestrator that utilizes the trained policy execution model to optimize resources and licenses for optimal throughput per cost, while also meeting business objectives such as design timelines.

The policy execution model may employ the policy parameters to generate the rules that define each of the one or more policies to apply during execution of a job request. The policy parameters and the rules may relate both to resources and to licenses. As such, the optimization platform may train the policy execution model to generate policies that relate both to resources and to licenses, and the trained policy execution model may identify policies to apply during execution of a job request that address resource issues and license issues concurrently.

The policy parameters may define resources and licenses to which the rules apply, how the rules are classified, which rules apply to a job, and/or the like. For example, the policy parameters may include an optimization entity object that defines the resources and the licenses of the high-performance computing environment. The optimization entity object may define resources (e.g., CPU, memory, and/or the like) that are to be optimized, and may define licenses (e.g., software licenses) that are to be optimized. Additionally, or alternatively, the policy parameters may include one or more criteria classifiers to apply for optimization rules. The criteria classifiers may classify criteria, for the optimization rules, that includes memory buckets, runtime limits, license availability, and/or the like). Additionally, or alternatively, the policy parameters may include one or more permissible values of the one or more criteria classifiers. For example, in the case of license availability, permissible values may include "available" or "not available".

Additionally, or alternatively, the policy parameters may include one or more rule classifiers that classify rules to apply to jobs. The rule classifiers may classify rules to apply to jobs (such as the application of memory multipliers, CPU multipliers, and/or the like) and may have permissible values (e.g., "include", "exclude", "pend", and/or the like). Additionally, or alternatively, the policy parameters may include one or more job properties to define which of the rules to apply to each of the jobs. The job properties may include a product property, a function property, a component property, and/or the like to define which of the rules to apply to each of the jobs. Additionally, or alternatively, the policy parameters may include one or more job criteria rules. The job criteria rules may construct an entire rule to be applied such as "If an incoming job is seeking license X, and license X is not available, then put the job on 'pend' state". As another example, the job criteria rules may construct a rule to be applied such as "If an incoming job with product code X is requesting high memory (e.g., greater than 100 GB), then provide a memory multiplier of 1.5×".

Based on the policy parameters defined above, the policy execution model may provide an operator (e.g., a network operator, an information technology (IT) operator, and/or the like) with the flexibility to easily create any kind of rule for an optimization policy. In some implementations, the optimization platform utilizes the policy execution model to create multiple policies, each with a respective set of rules. For example, the policy execution model may provide flexibility by creating policies that maintain validated templates to quickly apply when certain variables change in the high-performance computing environment.

Figure 1C:
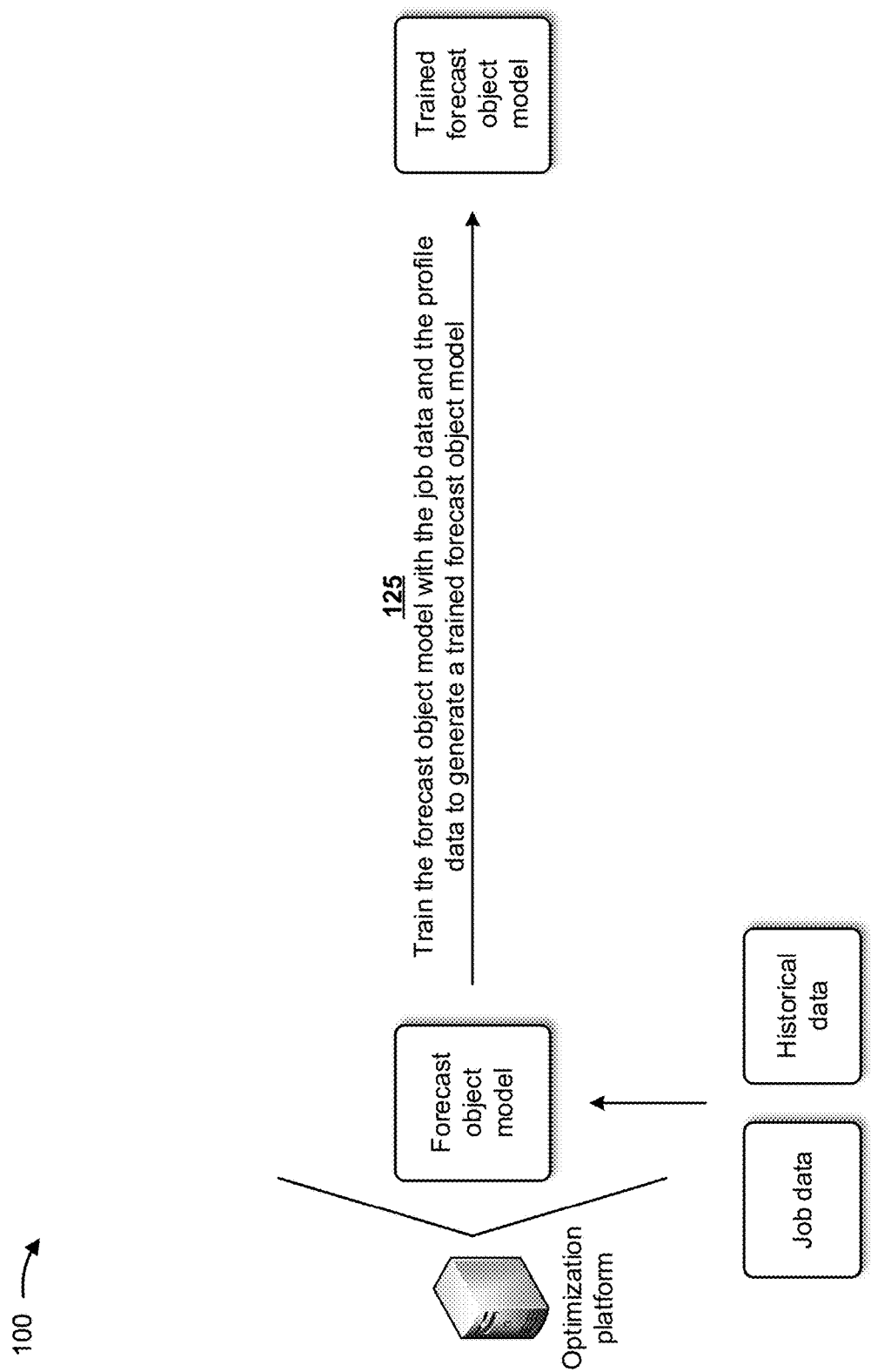

As shown in FIG. 1C, and by reference number 125, the optimization platform may train the forecast object model with the job data and the profile data to generate a trained forecast object model. As will be described herein, the trained forecast object model may process the job request to generate a forecast of resources and licenses required from the high-performance computing environment. In some implementations, the trained forecast object model may be implemented by a demand planner that provides short-term, mid-term, and/or long-term planning utilizing the forecast object model to predict a future roadmap for using resources and licenses in a way that achieves optimal throughput per cost. The optimization platform may train the forecast object model with historical data (e.g., historical job data, historical profile data, and/or the like) to generate the trained forecast object model. For example, the optimization platform may train the forecast object model in a manner similar to the manner described below in connection with FIG. 1H.

The job data may define resources and licenses to which the forecast applies, milestones and dates for jobs, and/or the like. For example, the job data may include data identifying an optimization entity object, one or more job roadmaps, and/or the like. The optimization entity object may define the resources and the licenses of the high-performance computing environment (e.g., similar to the optimization entity object included in the policy parameters), and may include past, current, and forecast versions. The job roadmaps may represent milestones for desired outputs of jobs, such as a product design release for a product design job (e.g., as may be provided by an engineering organization associated with the design). The job data may relate both to resources and licenses.

The profile data may include historical resource consumption by the resources of the high-performance computing environment (e.g., resource consumption patterns recorded by the job scheduler). Additionally, or alternatively, the profile data may include historical license consumption by the licenses of the high-performance computing environment (e.g., license usage patterns recorded by the license manager). Additionally, or alternatively, the profile data may include historical properties associated with the resources and the licenses of the high-performance computing environment. Additionally, or alternatively, the profile data may include historical rules utilized by the high-performance computing environment (e.g., rules applied by the resource orchestrator). The profile data may relate both to resources and licenses.

Figure 1D:
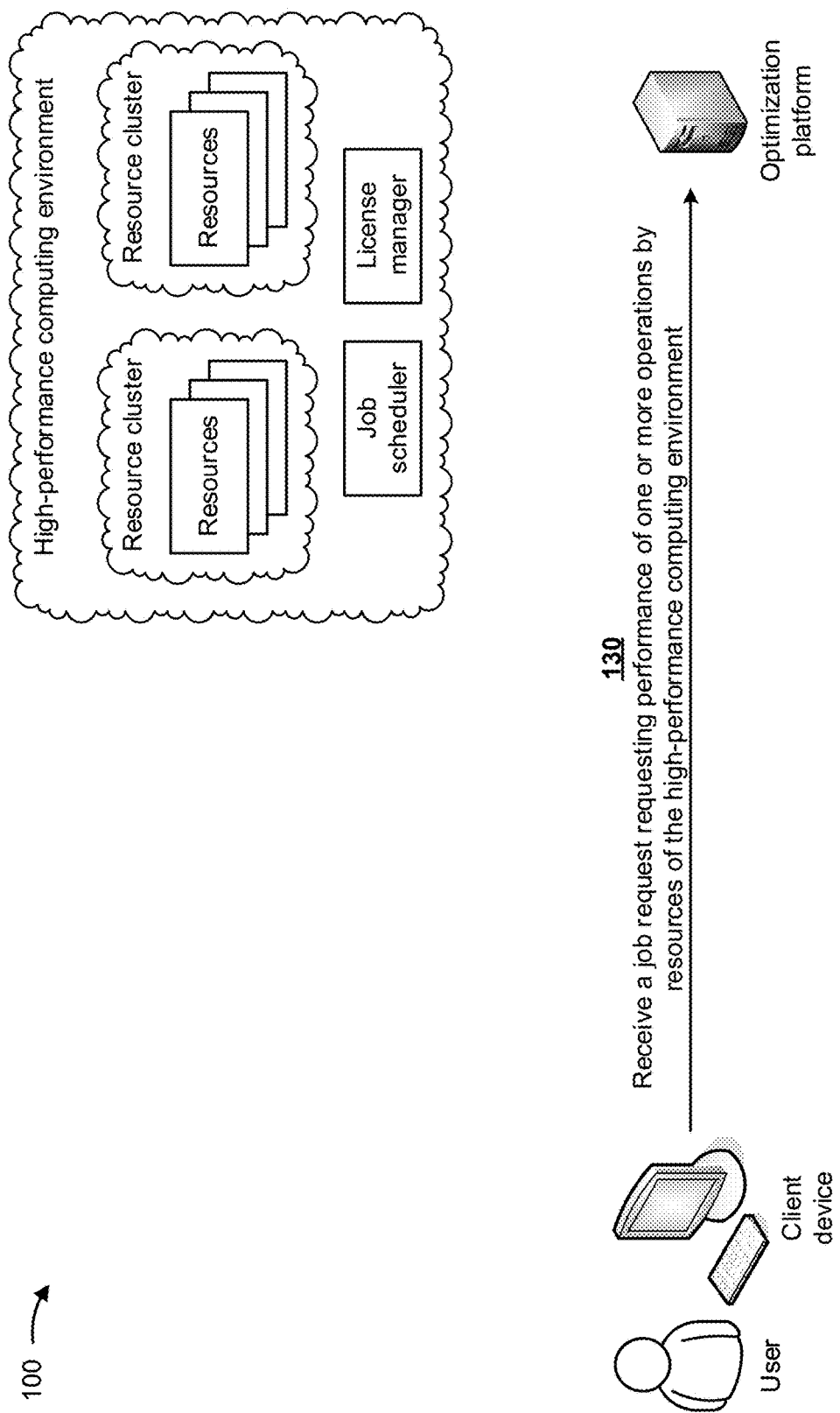

As shown in FIG. 1D, and by reference number 130, the optimization platform may receive a job request requesting performance of one or more operations by resources of the high-performance computing environment. The job request may relate to a computing job, an engineering job, a design job, and/or the like. The job request may reflect expected resource needs (e.g., processing resources, memory resources, and/or the like) in order for the job to be executed in the high-performance computing environment. The resources may include processing resources, memory resources, and/or the like. For example, a job request for a particular job may include a request for 300 GB of memory and 8 processor cores, such as may be expected to be necessary to execute the particular job. In some implementations, the optimization platform intercepts job requests destined for a job scheduler.

Figure 1E:
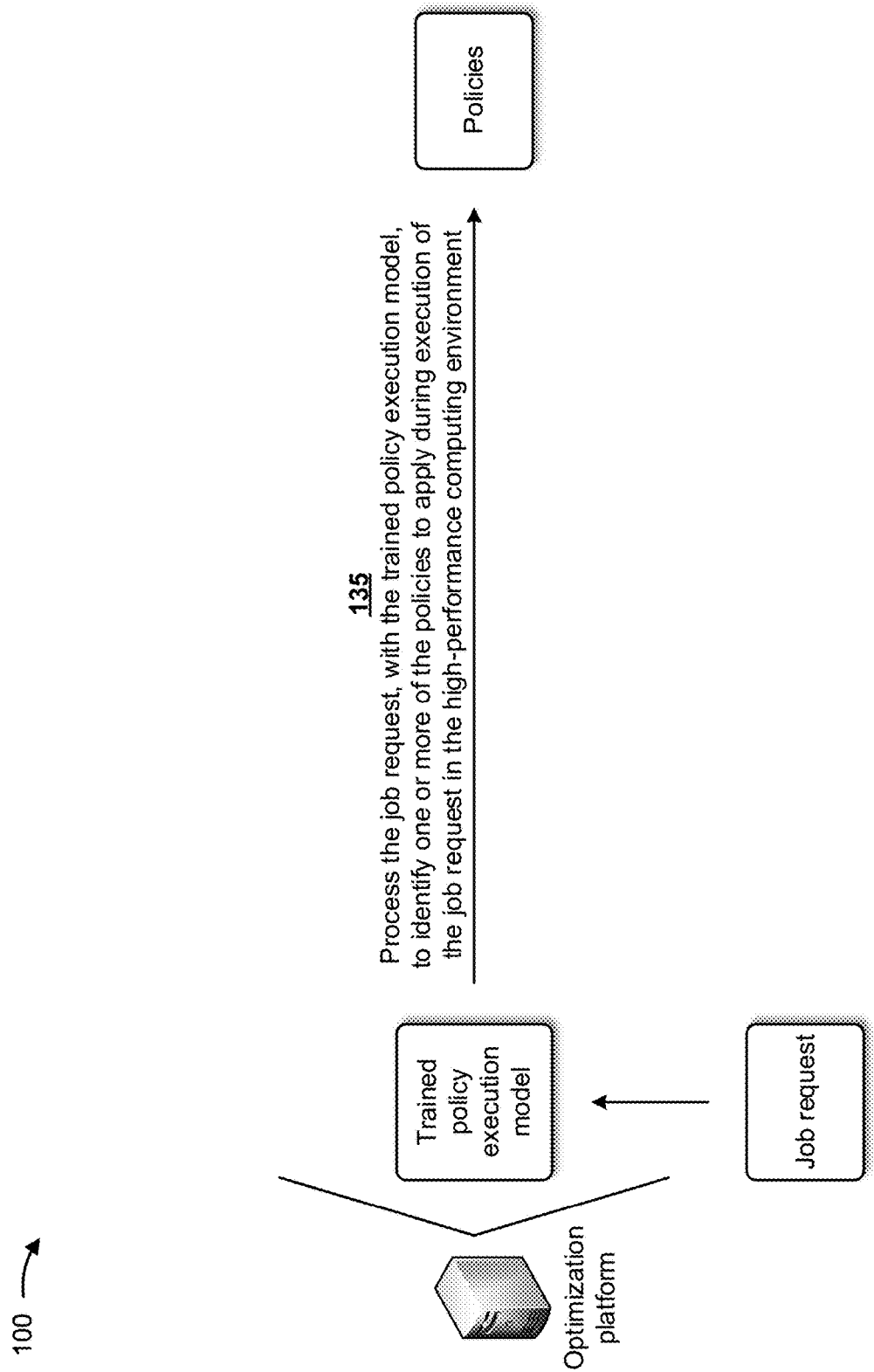

As shown in FIG. 1E, and by reference number 135, the optimization platform may process the job request, with the trained policy execution model, to identify one or more of the policies to apply during execution of the job request in the high-performance computing environment. When processing the job request, the optimization platform may apply the policy execution model, in a manner similar to the manner described below in connection with FIG. 1H, to identify the one or more of the policies to apply during execution of the job request.

As described above, the policy execution model may be implemented by a resource orchestrator that utilizes the trained policy execution model to optimize resources and licenses for optimal throughput per cost, while also meeting business objectives such as design timelines. When processing the job request, the resource orchestrator may intercept an incoming job request (e.g., through a web service API), and may overlay a pre-designed policy or rule appropriate for the job request, before the job request gets submitted to the job scheduler.

The one or more policies may address both resource issues and license issues concurrently. In some implementations, when processing the job request, the optimization platform identifies one or more policies that contribute to ensuring that an optimized schedule (as will be described below) for the job request maximizes a throughput per cost metric for the job request, and satisfies objectives of the job request.

Figure 1F:
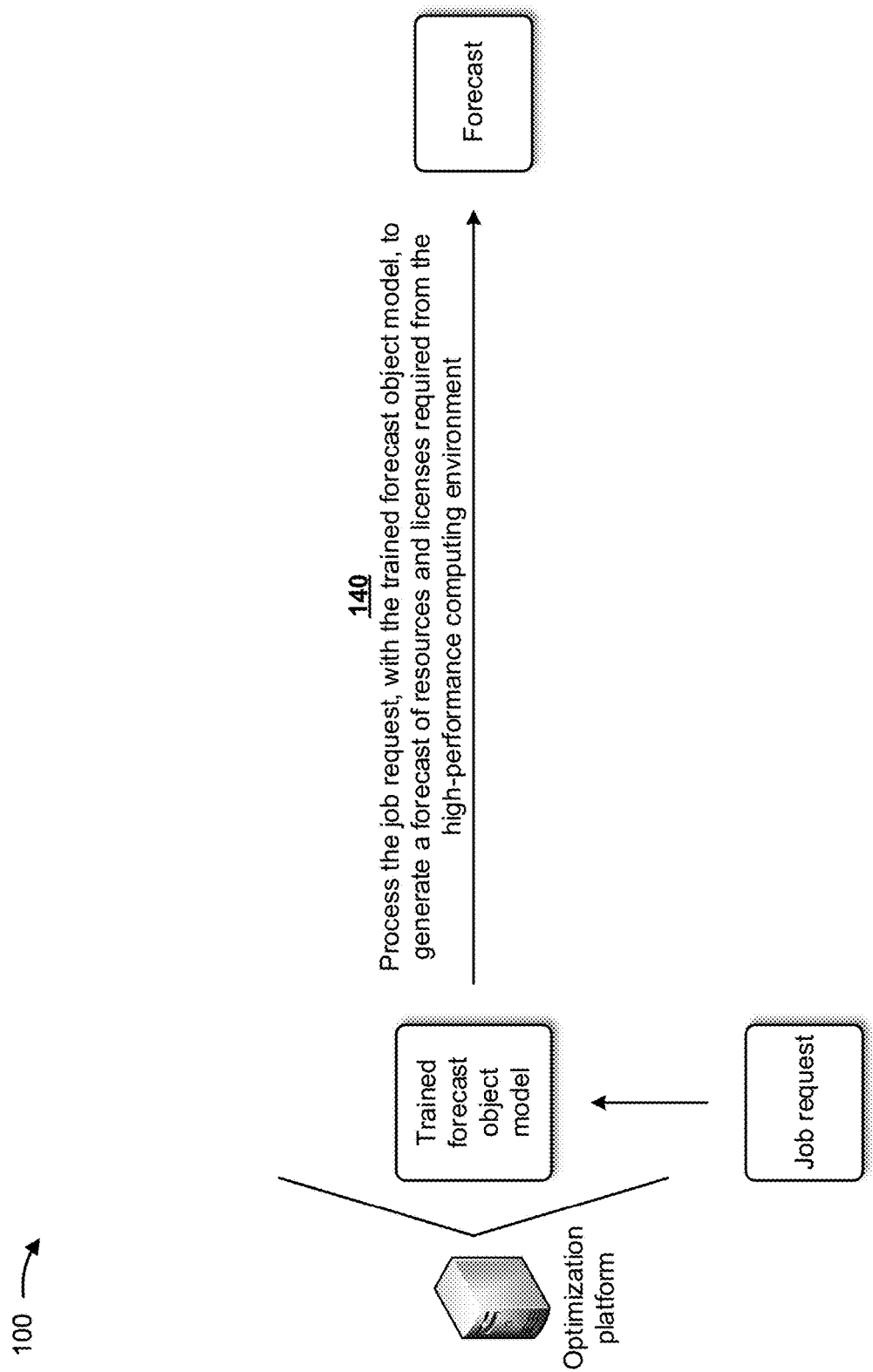

As shown in FIG. 1F, and by reference number 140, the optimization platform may process the job request, with the trained forecast object model, to generate a forecast of resources and licenses required from the high-performance computing environment. When processing the job request, the optimization platform may apply the forecast object model, in a manner similar to the manner described below in connection with FIG. 1K to generate the forecast of resources and licenses. As described above, the trained forecast object model may be implemented by a demand planner that provides short-term, mid-term, and/or long-term planning utilizing the forecast object model to predict a future roadmap for using resources and licenses in a way that achieves optimal throughput per cost.

As shown in FIG. 1G, and by reference number 145, the optimization platform may process the job request, other job requests, the one or more policies, and the forecast, with a heuristic model, to determine a schedule for the job request. The schedule may address both resource issues and license issues concurrently.

The optimization platform may train the heuristic model with historical data (e.g., historical job requests, historical policies, historical forecasts, and/or the like) to determine a schedule for the job request. For example, the optimization platform may train the heuristic model in a manner similar to the manner described below in connection with FIG. 1H. The optimization platform may use the heuristic model to process the employee data and the skill data in a manner similar to the manner described below in connection with FIG. 1H, to determine a schedule for the job request.

In some implementations, the heuristic model may include a job priority-based packing heuristic model. In some implementations, the heuristic model may be configured to simulate consumption of resources and licenses by one or more jobs by applying a process with rules and priorities, as described below. An output of the heuristic model may include an identification (e.g., visualization) of gaps, which can be addressed tactically for production scheduling. For example, gaps may be addressed by changing product priorities, borrowing resources from another cluster, and/or procuring additional resources if possible (e.g., via a cloud computing environment). The optimization platform may use the output of a schedule to feed a scheduler (e.g., the job scheduler) for a fairshare model or other consumption models. Based on driving fairness of the schedule, the optimization platform may provide explicit product priorities and a cost-based prioritization scheme that drives a lower cost model.

When determining a schedule for the job request, the heuristic model may initially determine job profiles for the job request and the other job requests based on profile data. For example, the heuristic model may identify a historical job consumption log of tagged job entities that roll up to a target job entity. The heuristic model may then apply one or more scaling factors to the job profiles (e.g., based on a number of jobs) to generate scaled job profiles. The heuristic model may assign one or more resources of the high-performance computing environment to the job request and to each of the other job requests based on the scaled job profiles. For example, each job may be assigned a resource when available. In some implementations, the resource assignment may be driven by a least cost model (e.g., where a cost of running the job is the least).

The heuristic model may prioritize the job request and the other job requests (e.g., based on products or costs associated with the job request and the other job requests). For example, the heuristic model may bump a lower priority job if the lower priority job is found to be ahead of the scheduled job and beyond a start time of a target job. The prioritization may drive product priority and cost-based fair-share allocation of resources with an explicit and cost-based prioritization, while packing for the highest throughput.

In some implementations, prioritization may be product-based. In this case, the heuristic model may assign higher priorities to particular products associated with the job request or one or more of the other job requests. For example, a product priority may be explicitly assigned in an engineering roadmap and given a first right to execution regardless of cost or other factors. In some implementations, prioritization may be cost-based. In this case, the heuristic model may assign priorities to the job request and the other job requests based on costs of executing the job request and the other job requests in the high-performance computing environment.

As an example of a cost-based priority, the heuristic model may prioritize a cost of executing the job to ensure a more expensive product is not waiting for resources, as follows. The cost of execution may be determined based on a cost per unit of time for resources (e.g., loaded cost of resources over three years of depreciation), a cost per unit of time for licenses (e.g., license cost of a contract per contract period), and/or the like. For example, the cost of execution of a job may be calculated using the equation below:

$$C_{job} = (T_{run} + T_{wait}) * (C_{compute} + C_{license})$$

where $C_{job}$ corresponds to the cost of execution of a job, $T_{run}$ corresponds to a job runtime or scaled runtime, $T_{wait}$ corresponds to an amount of time a job waits for execution, $C_{compute}$ corresponds to the cost per unit of time for resources (e.g., servers), and $C_{license}$ corresponds to the cost per unit of time for licenses.

The heuristic model may reassign the resources of the high-performance computing environment to the job request and to each of the other job requests based on prioritizing the job request and the other job requests. In some implementations, the heuristic model may continue to re-assign the resources while lower priority jobs are found to be ahead of the scheduled job and beyond a start time of a target job. Thereafter, the heuristic model may determine the schedule for the job request based on reassigning the one or more resources of the high-performance computing environment. The job may be assigned a share of resources (e.g., a memory, a processor, and/or another resource) and licenses for consumption. In some implementations, holidays and weekends may be excluded from an associated schedule.

Figure 1H:
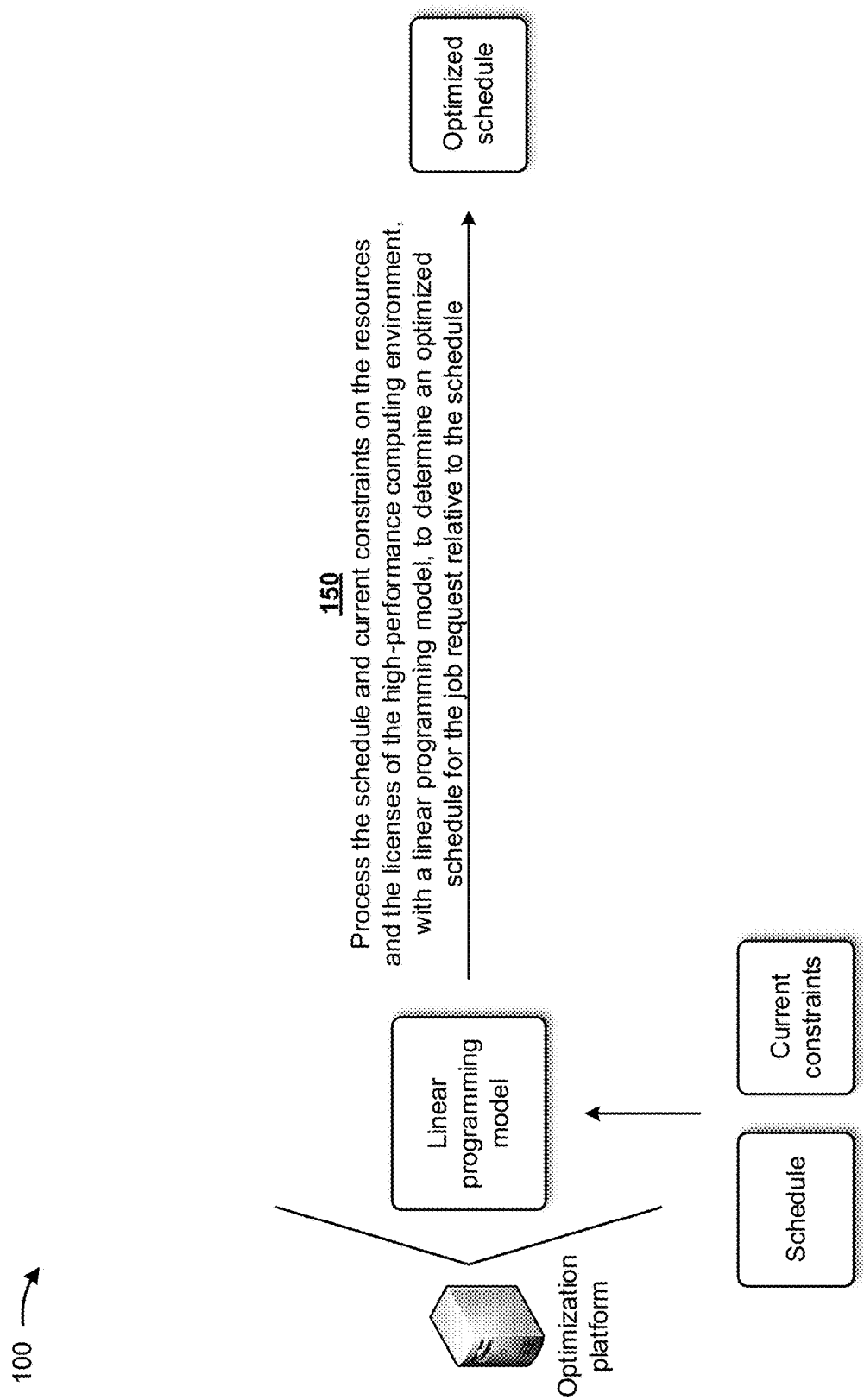

As shown in FIG. 1H, and by reference number 150, the optimization platform may process the schedule and current constraints on the resources and the licenses of the high-performance computing environment, with a linear programming model, to determine an optimized schedule for the job request relative to the schedule. The optimized schedule may provide a maximal throughput, a minimal cost, a maximal throughput per cost, and/or the like.

In some implementations, the linear programming model may be a machine learning model. The linear programming model may be trained (e.g., by the optimization platform and/or by one or more other platforms associated with the optimization platform) using historical data that is associated with determining an optimized schedule for the job request based on historical values for one or more linear programming parameters. The linear programming parameters may include the schedule, generated by the heuristics model, and current constraints on the resources and the licenses of the high-performance computing environment. Using the historical data and values for the one or more linear programming parameters as inputs to the linear programming model, the optimization platform may process the schedule and the current constraints to determine the optimized schedule, as described herein. In some implementations, the optimization platform may retrain the linear programming model by updating the historical data to include validated or invalidated results associated with input values of the linear programming parameters.

When determining the optimized schedule, the linear programming model may calculate changes to the current constraints on the resources of the high-performance computing environment, calculate changes to the current constraints on the licenses of the high-performance computing environment, and determine the optimized schedule based on the changes to the current constraints on the resources and the changes to the current constraints on the licenses. In some implementations, the linear programming model uses the schedule produced by the heuristics model as a baseline. This may prevent the optimization from becoming too unbounded and difficult to execute. In some implementations, the linear programming model constrains a current supply (e.g., of resources) to prevent the current supply from being renegotiated and/or modified.

The linear programming model may calculate the changes to the current constraints on the resources by, for example, calculating changes based on new servers (or other resources) that could be purchased for growth in the future, based on potentially refreshing old servers (or other resources) in the future, based on employing a different kind of contract with a cloud service provider, and/or the like. The linear programming model may calculate the changes to the current constraints on the licenses of the high-performance computing environment by, for example, calculating changes based on planned contract changes in the horizon (e.g., ascertained from license negotiators or an engineering lead in charge of the design licenses).

Figure 1I:
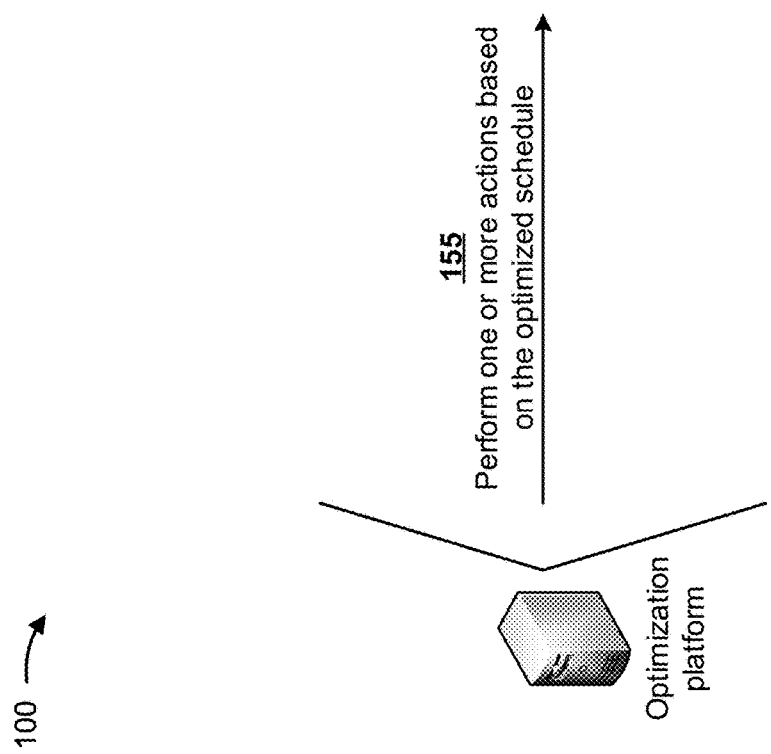

As shown in FIG. 1I, and by reference number 155, the optimization platform may perform one or more actions based on the optimized schedule. The one or more actions may include the optimization platform providing, to a client device, information identifying the optimized schedule (e.g., for display to a user of the client device, such as an operator). Additionally, the one or more actions may include the optimization platform causing the optimized schedule and the one or more policies to be implemented by a job scheduler and a license manager of the high-performance computing environment (e.g., to schedule jobs with sufficient resources, to concurrently assign appropriate licenses to the jobs, and/or the like). Additionally, the one or more actions may include the optimization platform providing, to a client device, information identifying a throughput and a cost of the optimized schedule (e.g., for display to a user, such as an operator). Additionally, the one or more actions may include the optimization platform causing another schedule of another job request to be modified based on the optimized schedule (e.g., to accommodate the optimized schedule and/or align with the optimized schedule). Additionally, the one or more actions may include the optimization platform causing an order to be placed for one or more additional resources based on the optimized schedule (e.g., for one or more particular resources to supplement resources that are identified as insufficient to process a job request based on the optimized schedule). In this way, the optimization platform may improve overall efficiency of the high-performance computing environment, which may increase throughput, reduce cost, increase throughput per cost ratio, and/or the like. In turn, this may conserve computing resources, human resources, and/or the like associated with operating the high-performance computing environment.

Additionally, the one or more actions may include the optimization platform retraining the policy execution model, the forecast object model, the heuristic model, and/or the linear programming model based on the optimized schedule. In this way, the optimization platform may improve the accuracy of the models. This, in turn, may improve speed and efficiency of the models, and thereby conserve computing resources, human resources, and/or the like that would have otherwise been used to process job requests in a less efficient manner.

The optimization platform described above can be applied to a number of different use cases. As one example, the optimization platform may improve throughput for constrained licenses (e.g., when licenses have already been negotiated and bought, but there is room for optimization of throughput by selection of computing hosts based on incoming job profile). In such cases, the optimization platform may design and implement a rule, using the policy execution model, to require, for example, that premier licenses be placed on computing hosts with the fastest processors. Execution of such a policy may enable higher utilization of premier licenses, which may result in higher throughput given similar cost and resources.

As another example, the optimization platform may assign priority to critical products on constrained licenses (e.g., when licenses have already been negotiated and bought, but there are some constrained licenses that need prioritization). In such cases, the forecast object model may provide a forecast with prioritized products, users, and/or other metadata needed to identify the priority. The optimization platform may utilize the policy execution model to use the priority to ensure the job scheduler acts on the priority. For example, the optimization platform may utilize the policy execution model to hold the job, for non-critical products or entities, until there is no prioritized entity in a queue, and/or terminate a less critical job, to make way for a prioritized job.

As yet another example, the optimization platform may address a situation where execution of a job results in more licenses than resources, or a situation where execution of a job results in more resources than licenses. In such cases, the optimization platform may use the forecast object model to reconcile a supply and highlight a gap. The optimization platform may use the forecast object model to make recommendations for optimization. For example, the recommendation may be to buy more resources if more throughput and excess licenses result, or to reduce resource purchases if resources are in excess.

As still another example, the optimization platform may provide a granular forecast of resources to optimize for cost of licenses (e.g., when the forecast object model forecasts to a granularity of options provided, so that a maximum throughput per cost can be achieved for a given roadmap). In such cases, the forecast object model may be provided all possible stock keeping units (SKUs) of resources, in a cloud (e.g., On Prem) with respective costs. The forecast object model may also be provided with contract options associated with costs of licenses. The forecast object model may provide an optimal throughput per cost option based on the available choices.

In this way, the optimization platform utilizes machine learning to concurrently optimize resources and licenses in a high-performance computing environment. By generating an optimized schedule that concurrently optimizes both resources and licenses associated with requested jobs, the optimization platform enables execution of the jobs in a way that reduces resource conflicts, license conflicts, insufficient resource allocations, insufficient licenses, unavailable computing resources, unavailable licenses, and/or the like. This conserves computing resources (e.g., processing resources, memory resources, etc.) and/or the like that would otherwise have been wasted as a result of job failures and delays, that would otherwise be required to debug resource and license conflicts, and/or the like. Furthermore, by generating the optimized schedule, the optimization platform increases throughput, decreases costs, and/or increases a throughput per cost ratio.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
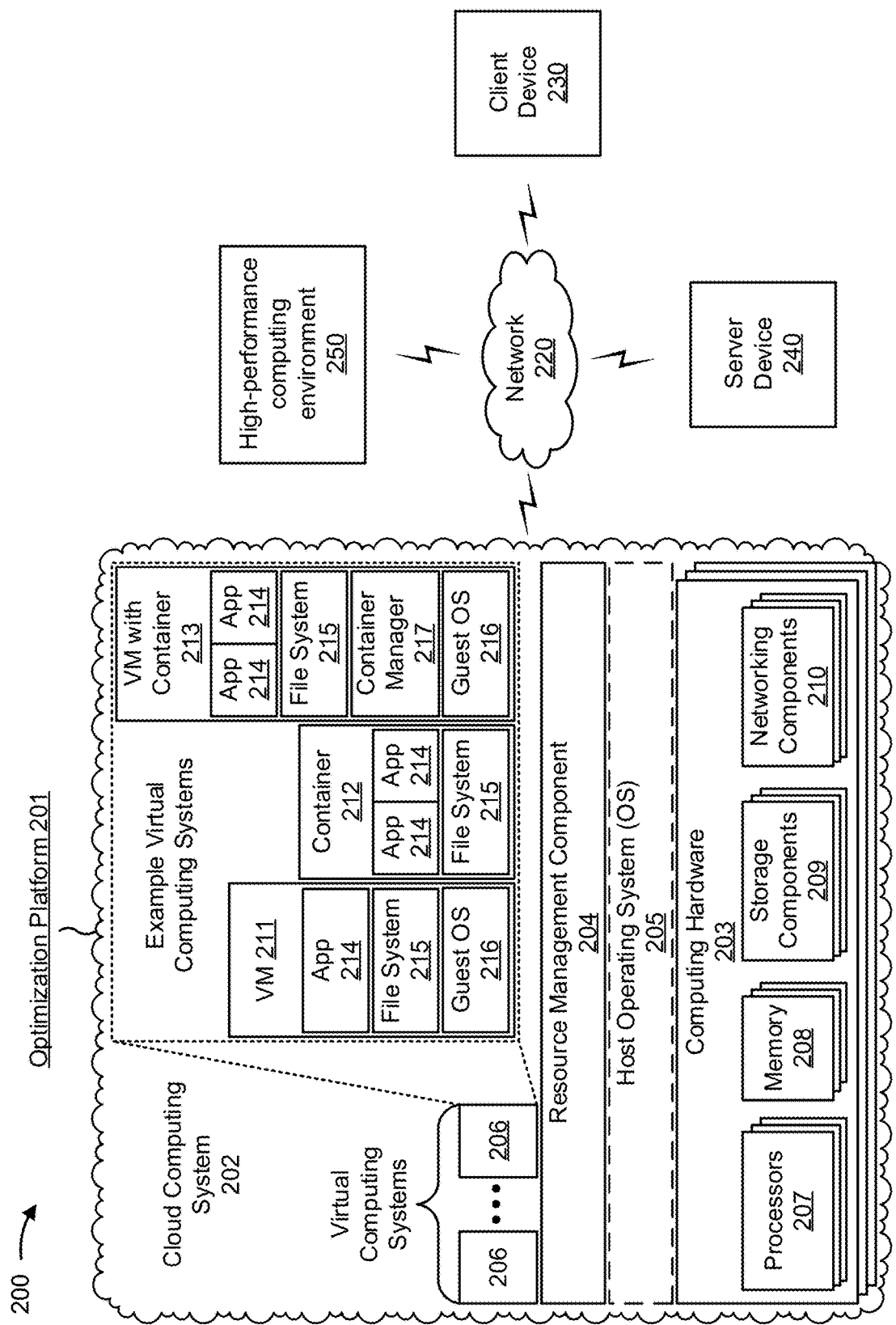
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an optimization platform 201. The optimization platform 201 may include one or more elements of a cloud computing system 202 and/or may execute within the cloud computing system 202 (e.g., as one or more virtual computing systems 206). The cloud computing system 202 may include one or more elements 203-217, as described in more detail below. As further shown in FIG. 2, environment 200 may include a network 220 and a client device 230. Devices of environment 200 may interconnect via wired connections, wireless connections, or a combination of wired and wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using such virtualization, the resource management component 204 enables a single computing device (e.g., a computer, a server, a host device, and/or the like) to operate as if the single computing device were multiple computing devices, such as by creating multiple isolated virtual computing systems 206 from computing hardware 203 of the single computing device. The multiple virtual computing systems 206 operate independently from one another and do not interact with one another.

Computing hardware 203 includes hardware and corresponding resources from one or more computing devices. For example, computing hardware 203 may include hardware from a single computing device (e.g., a single server or host device) or from multiple computing devices (e.g., multiple servers or host devices), such as multiple computing devices in one or more data centers, server farms, server pools, and/or the like. As shown, computing hardware 203 may include one or more processors 207, one or more memories 208, one or more storage components 209, and/or one or more networking components 210. Computing hardware 203 may be interconnected via one or more wired and/or wireless buses, which may interconnect computing hardware 203 within a single computing device and/or across multiple computing devices.

A processor 207 includes a central processing unit, a graphics processing unit, and/or the like. A memory 208 includes random access memory, read-only memory, and/or the like. The memory 208 may store a set of instructions (e.g., one or more instructions) for execution by the processor 207. The processor 207 may execute the set of instructions to perform one or more operations or processes described herein. In some implementations, execution of the set of instructions, by one or more processors 207, causes the one or more processors 207 and/or the optimization platform 201 to perform one or more operations or processes described herein. A storage component 209 includes a hard disk or another type of storage device that stores information, data, and/or software (e.g., code, instructions, and/or the like) related to the operation and use of the optimization platform 201. In some implementations, memory 208 and/or storage component 209 is/are implemented as a non-transitory computer readable medium. A networking component 210 includes a network (or "communication") interface and corresponding hardware that enables the optimization platform 201 to communicate with other devices of environment 200 via a wired connection and/or a wireless connection, such as via network 220.

The resource management component 204 includes a virtualization application (e.g., executing on hardware, such as computing hardware 203) capable of virtualizing computing hardware 203 to start (e.g., create or spin up), stop (e.g., delete or tear down), and/or manage one or more virtual computing systems 206. The resource management component 204 may include a hypervisor or a virtual machine monitor, such as when the virtual computing systems 206 are virtual machines 211. Additionally, or alternatively, the resource management component 204 may include a container manager, such as when the virtual computing systems 206 are containers 212.

In some implementations, the resource management component 204 executes within and/or in coordination with a host operating system 205. For example, the resource management component 204 may execute on top of the host operating system 205 rather than interacting directly with computing hardware 203, such as when the resource management component 204 is a hosted hypervisor (e.g., a Type 2 hypervisor) or a container manager. In this case, the host operating system 205 may control access to and/or use of computing hardware 203 and/or software executing on computing hardware 203 based on information and/or instructions received from the resource management component 204. Alternatively, the resource management component 204 may interact directly with computing hardware 203 rather than interacting with the host operating system 205, such as when the resource management component 204 is a bare-metal hypervisor (e.g., a Type 1 hypervisor). Thus, in some implementations, the cloud computing system 202 does not include a host operating system 205. In some implementations, the host operating system 205 includes and/or executes an administrator application to enable a system administrator to manage, customize, and/or configure cloud computing system 202.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications 214 using a file system 215. The file system 215 may include binary files, software libraries, and/or other resources required to execute applications 214 on a guest operating system 216 or the host operating system 205. In some implementations, a virtual computing system 206 (e.g., a virtual machine 211 or a hybrid environment 213) includes a guest operating system 216. In some implementations, a virtual computing system 206 (e.g., a container 212 or a hybrid environment 213) includes a container manager 217.

A virtual machine 211 is an emulation of a computing device that enables execution of separate, isolated instances of virtual computing devices (e.g., multiple virtual machines 211) on the same computing hardware 203. The guest operating systems 216 and applications 214 of multiple virtual machines 211 may share computing hardware 203 from a single computing device or from multiple computing devices (e.g., a pool of computing devices). Each separate virtual machine 211 may include a guest operating system 216, a file system 215, and one or more applications 214. With a virtual machine 211, the underlying computing hardware 203 is virtualized, and the guest operating system 216 executes on top of this virtualized hardware. Using virtual machines 211 enables different types of guest operating systems 216 to execute on the same computing hardware 203 in an isolated environment, but with more resource usage and overhead than containers 212.

Unlike a virtual machine 211, a container 212 virtualizes a host operating system 205 rather than the underlying computing hardware 203. Thus, a container 212 does not require a guest operating system 216 because the application(s) 214 included in the container 212 execute directly on the host operating system 205 using a file system 215 included in the container 212. Each separate container 212 may share the kernel of the host operating system 205, and different applications 214 within a single container 212 may share a file system 215. This sharing of a file system 215 among multiple applications 214 reduces the need to reproduce operating system code for different applications, and enables a single host operating system 205 to execute multiple applications 214 and/or containers 212. As a result, containers 212 enable a greater quantity of applications 214 to execute on a smaller quantity of computing devices as compared to virtual machines 211.

A hybrid environment 213 includes elements of a virtual machine 211 and a container 212. For example, a hybrid environment 213 may include a guest operating system 216 that executes on top of virtualized hardware. A container manager 217 may execute on top of the guest operating system 216 to start, stop, and/or manage one or more containers within the hybrid environment 213. Using a hybrid environment 213 enables different types of guest operating systems 216 to execute on the same computing hardware 203 in an isolated environment, while also enabling lightweight containers to execute on top of the guest operating system 216.

The quantity of applications 214 shown in FIG. 2 as executing within each virtual computing system 206 is shown as an example, and a different quantity of applications 214 may execute within each virtual computing system. Furthermore, although the optimization platform 201 may include one or more elements 203-217 of the cloud computing system 202, may execute within the cloud computing system 202, and/or may be hosted within the cloud computing system 202, in some implementations, the optimization platform 201 may not be cloud-based (e.g., may be implemented outside of a cloud computing system) or may be partially cloud-based. For example, the optimization platform 201 may include one or more devices that are not part of the cloud computing system 202, which may include a standalone server or another type of computing device. The optimization platform 201 may perform one or more operations and/or processes described in more detail elsewhere herein.

Network 220 includes one or more wired and/or wireless networks. For example, network 220 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 220 enables communication among the devices of environment 200.

Client device 230 includes one or more devices capable of receiving, generating, storing, processing, and/or providing information, such as information described herein. For example, client device 230 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 230 may receive information from and/or transmit information to optimization platform 201. Client device 230 may include one or more hardware components, such as those described above in connection with computing hardware 203 (e.g., one or more processors 207, memories 208, storage components 209, networking components 210, and/or the like).

Server device 240 includes one or more devices capable of receiving, generating, storing, processing, providing, and/or routing information, such as information described herein. Server device 240 may include, for example, a server, an application server, a client server, a web server, a database server, a host server, a proxy server, a virtual server (e.g., executing on computing hardware), a server in a cloud computing system, a device that includes computing hardware used in a cloud computing environment, or a similar type of device. The server device 240 may communicate with one or more other devices of environment 200, as described elsewhere herein. Server device 240 may include one or more hardware components, such as those described above in connection with computing hardware 203 (e.g., one or more processors 207, memories 208, storage components 209, networking components 210, and/or the like).

High-performance computing environment 250 includes one or more servers, one or more computers, one or more processors having one or more cores, one or more memory units, one or more storage units, and/or similar types of devices. In some implementations, high-performance computing environment 250 includes a job server, a license manager, a resource orchestrator, a demand planner, and/or the like, as described herein. High-performance computing environment 250 may aggregate computing resources in a way that delivers much higher performance than is obtainable from a typical desktop computer or workstation. High-performance computing environment 250 may include one or more components as described above in connection with optimization platform 201.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
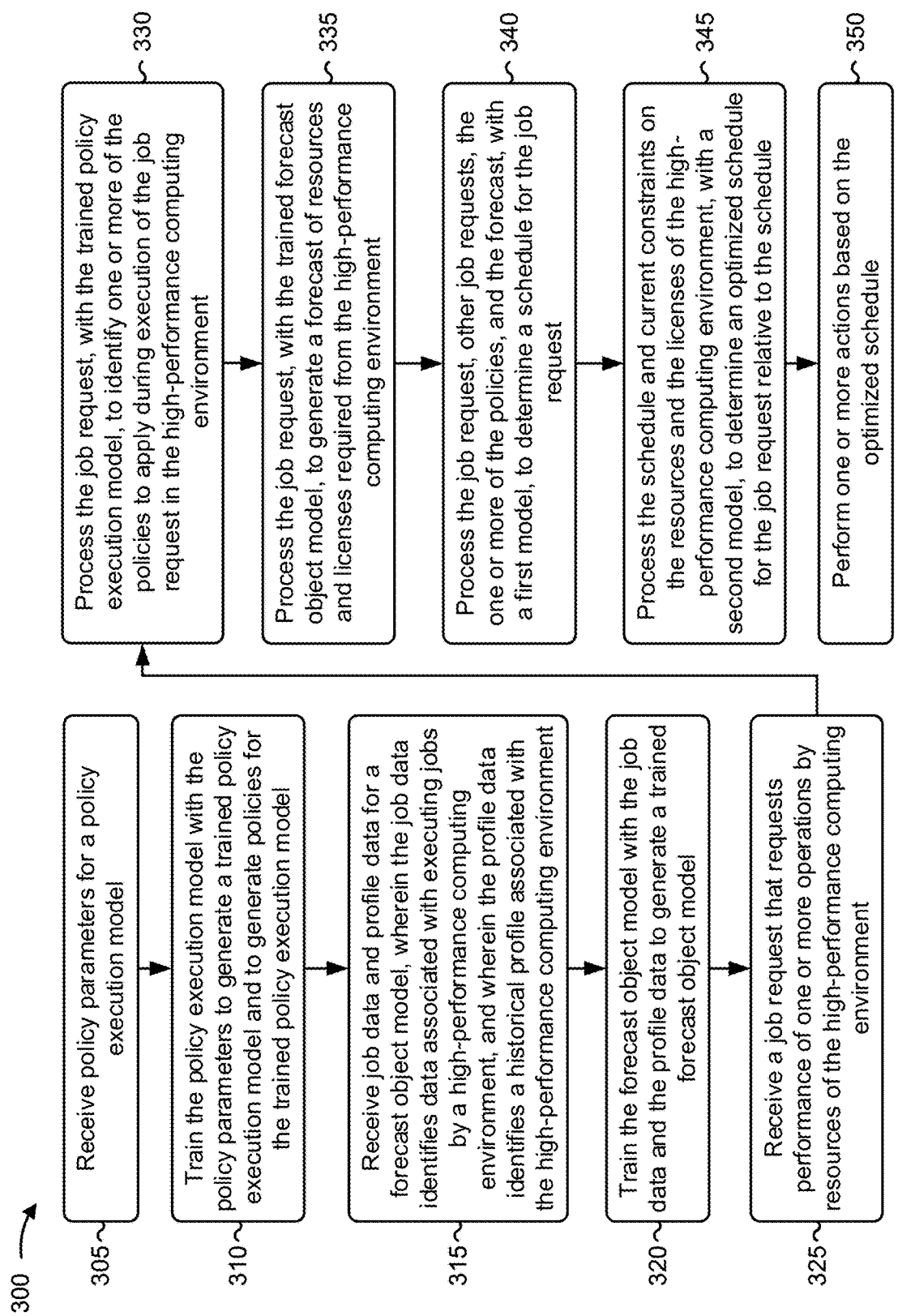
FIG. 3 is a flow chart of an example process relating to utilizing machine learning to concurrently optimize resources and licenses in a high-performance computing environment.

FIG. 3 is a flow chart of an example process 300 associated with utilizing machine learning to concurrently optimize resources and licenses in a high-performance computing environment. In some implementations, one or more process blocks of FIG. 3 may be performed by an optimization platform (e.g., optimization platform 201). In some implementations, one or more process blocks of FIG. 3 may be performed by another device or a group of devices separate from or including the optimization platform, such as a client device (e.g., client device 230), a server device (e.g., server device 240), a high-performance computing environment (e.g., high-performance computing environment 250), and/or the like.

As shown in FIG. 3, process 300 may include receiving policy parameters for a policy execution model (block 305). For example, the optimization platform may receive policy parameters for a policy execution model, as described above.

As further shown in FIG. 3, process 300 may include training the policy execution model with the policy parameters to generate a trained policy execution model and to generate policies for the trained policy execution model (block 310). For example, the optimization platform may train the policy execution model with the policy parameters to generate a trained policy execution model and to generate policies for the trained policy execution model, as described above.

As further shown in FIG. 3, process 300 may include receiving job data and profile data for a forecast object model, wherein the job data identifies data associated with executing jobs by a high-performance computing environment, and wherein the profile data identifies a historical profile associated with the high-performance computing environment (block 315). For example, the optimization platform may receive job data and profile data for a forecast object model, as described above. In some implementations, the job data identifies data associated with executing jobs by a high-performance computing environment. In some implementations, the profile data identifies a historical profile associated with the high-performance computing environment.

As further shown in FIG. 3, process 300 may include training the forecast object model with the job data and the profile data to generate a trained forecast object model (block 320). For example, the optimization platform may train the forecast object model with the job data and the profile data to generate a trained forecast object model, as described above.

As further shown in FIG. 3, process 300 may include receiving a job request that requests performance of one or more operations by resources of the high-performance computing environment (block 325). For example, the optimization platform may receive a job request that requests performance of one or more operations by resources of the high-performance computing environment, as described above.

As further shown in FIG. 3, process 300 may include processing the job request, with the trained policy execution model, to identify one or more of the policies to apply during execution of the job request in the high-performance computing environment (block 330). For example, the optimization platform may process the job request, with the trained policy execution model, to identify one or more of the policies to apply during execution of the job request in the high-performance computing environment, as described above.

As further shown in FIG. 3, process 300 may include processing the job request, with the trained forecast object model, to generate a forecast of resources and licenses required from the high-performance computing environment (block 335). For example, the optimization platform may process the job request, with the trained forecast object model, to generate a forecast of resources and licenses required from the high-performance computing environment, as described above.

As further shown in FIG. 3, process 300 may include processing the job request, other job requests, the one or more of the policies, and the forecast, with a first model, to determine a schedule for the job request (block 340). For example, the optimization platform may process the job request, other job requests, the one or more of the policies, and the forecast, with a first model, to determine a schedule for the job request, as described above.

As further shown in FIG. 3, process 300 may include processing the schedule and current constraints on the resources and the licenses of the high-performance computing environment, with a second model, to determine an optimized schedule for the job request relative to the schedule (block 345). For example, the optimization platform may process the schedule and current constraints on the resources and the licenses of the high-performance computing environment, with a second model, to determine an optimized schedule for the job request relative to the schedule, as described above.

As further shown in FIG. 3, process 300 may include performing one or more actions based on the optimized schedule (block 350). For example, the optimization platform may perform one or more actions based on the optimized schedule, as described above.

Process 300 may include additional implementations, such as any single implementation or any combination of implementations described below and/or in connection with one or more other processes described elsewhere herein.

In a first implementation, the first model is a heuristic model and the second model is a linear programming model.

In a second implementation, alone or in combination with the first implementation, performing the one or more actions comprises one or more of: providing, to a client device, information identifying the optimized schedule; causing the optimized schedule and the one or more of the policies to be implemented by a job scheduler and a license manager of the high-performance computing environment; or providing, to a client device, information identifying a throughput and a cost of the optimized schedule.

In a third implementation, alone or in combination with one or more of the first and second implementations, performing the one or more actions comprises one or more of: causing another schedule of another job request to be modified based on the optimized schedule; causing an order to be placed for one or more additional resources, for the high-performance computing environment, based on the optimized schedule; or retraining one or more of the policy execution model, the forecast object model, the first model, or the second model based on the optimized schedule.

In a fourth implementation, alone or in combination with one or more of the first through third implementations, processing the job request, the other job requests, the one or more of the policies, and the forecast, with the first model, to determine the schedule comprises: determining job profiles for the job request and the other job request based on the profile data; applying one or more scaling factors to the job profiles to generate scaled job profiles; assigning one or more resources of the high-performance computing environment to the job request and to each of the other job requests based on the scaled job profiles; prioritizing the job request and the other job requests based on products or costs associated with the job request and the other job requests; reassigning the one or more resources of the high-performance computing environment to the job request and to each of the other job requests based on prioritizing the job request and the other job requests, and determining the schedule for the job request based on reassigning the one or more resources of the high-performance computing environment.

In a fifth implementation, alone or in combination with one or more of the first through fourth implementations, prioritizing the job request and the other job requests based on the products associated with the job request and the other job requests comprises: prioritizing the job request and the other job requests by assigning higher priorities to particular products associated with the job request or one or more of the other job requests.

In a sixth implementation, alone or in combination with one or more of the first through fifth implementations, prioritizing the job request and the other job requests based on the costs associated with the job request and the other job requests comprises: prioritizing the job request and the other job requests by assigning priorities to the job request and the other job requests based on costs of executing the job request and the other job requests in the high-performance computing environment.

In a seventh implementation, alone or in combination with one or more of the first through sixth implementations, processing the schedule and the current constraints on the resources and the licenses of the high-performance computing environment, with the second model, to determine the optimized schedule, includes: calculating changes to the current constraints on the resources of the high-performance computing environment; calculating changes to the current constraints on the licenses of the high-performance computing environment; and determining the optimized schedule based on the changes to the current constraints on the resources and the changes to the current constraints on the licenses.

In an eighth implementation, alone or in combination with one or more of the first through seventh implementations, the optimized schedule for the job request maximizes a throughput per cost metric for the job request and for each of the other job requests.

In a ninth implementation, alone or in combination with one or more of the first through eighth implementations, the policy parameters include one or more of: an optimization entity object that defines the resources and the licenses of the high-performance computing environment; one or more criteria classifiers to apply for optimization rules, one or more permissible values of the one or more criteria classifiers, one or more rule classifiers that classify rules to apply to jobs, one or more job properties to define which of the rules to apply to each of the jobs, or one or more job criteria rules.

In a tenth implementation, alone or in combination with one or more of the first through ninth implementations, the job data includes data identifying one or more of: an optimization entity object that defines the resources and the licenses of the high-performance computing environment, or one or more job roadmaps that represent milestones for desired outputs of jobs.

In an eleventh implementation, alone or in combination with one or more of the first through tenth implementations, the profile data includes data identifying one or more of: historical resource consumption by the resources of the high-performance computing environment, historical license consumption by the licenses of the high-performance computing environment, historical rules utilized by the high-performance computing environment, or historical properties associated with the resources and the licenses of the high-performance computing environment.

In a twelfth implementation, alone or in combination with one or more of the first through eleventh implementations, the one or more policies and the forecast ensure that the optimized schedule for the job request maximizes a throughput per cost metric for the job request and for each of the other job requests and satisfies objectives of the job request and of each of the other job requests.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a device, policy parameters for a policy execution model;

training, by the device, the policy execution model with the policy parameters to generate a trained policy execution model and to generate policies for the trained policy execution model;

receiving, by the device, job data and profile data for a forecast object model,
wherein the job data identifies data associated with executing jobs by a high-performance computing environment, and
wherein the job data includes data identifying one or more of:
an optimization entity object that defines resources and licenses of the high-performance computing environment, or
one or more job roadmaps that represent milestones for desired outputs of jobs, and
wherein the profile data identifies a historical profile associated with the high-performance computing environment;

training, by the device, the forecast object model with the job data and the profile data to generate a trained forecast object model;

receiving, by the device, a job request that requests performance of one or more operations by resources of the high-performance computing environment;

processing, by the device, the job request, with the trained policy execution model, to identify one or more of the policies to apply during execution of the job request in the high-performance computing environment;

processing, by the device, the job request, with the trained forecast object model, to generate a forecast of the resources and the licenses required from the high-performance computing environment;

processing, by the device, the job request, other job requests, the one or more of the policies, and the forecast, with a first model, to determine a schedule for the job request;

processing, by the device, the schedule and current constraints on the resources and the licenses of the high-performance computing environment, with a second model, to determine an optimized schedule for the job request relative to the schedule; and performing one or more actions based on the optimized schedule.

2. The method of claim 1, wherein the first model is a heuristic model and the second model is a linear programming model.

3. The method of claim 1, wherein performing the one or more actions comprises one or more of:
providing, to a client device, information identifying the optimized schedule;
causing the optimized schedule and the one or more of the policies to be implemented by a job scheduler and a license manager of the high-performance computing environment; or
providing, to a client device, information identifying a throughput and a cost of the optimized schedule.

4. The method of claim 1, wherein performing the one or more actions comprises one or more of:
causing another schedule of another job request to be modified based on the optimized schedule;
causing an order to be placed for one or more additional resources, for the high-performance computing environment, based on the optimized schedule; or
retraining one or more of the policy execution model, the forecast object model, the first model, or the second model based on the optimized schedule.

5. The method of claim 1, wherein processing the job request, the other job requests, the one or more of the policies, and the forecast, with the first model, to determine the schedule comprises:
determining job profiles for the job request and the other job requests based on the profile data;
applying one or more scaling factors to the job profiles to generate scaled job profiles;
assigning one or more resources of the high-performance computing environment to the job request and to each of the other job requests based on the scaled job profiles;
prioritizing the job request and the other job requests based on products or costs associated with the job request and the other job requests;
reassigning the one or more resources of the high-performance computing environment to the job request and to each of the other job requests based on prioritizing the job request and the other job requests; and
determining the schedule for the job request based on reassigning the one or more resources of the high-performance computing environment.

6. The method of claim 5, wherein prioritizing the job request and the other job requests based on the products associated with the job request and the other job requests comprises:

prioritizing the job request and the other job requests by assigning higher priorities to particular products associated with the job request or one or more of the other job requests.

7. The method of claim 5, wherein prioritizing the job request and the other job requests based on the costs associated with the job request and the other job requests comprises:
prioritizing the job request and the other job requests by assigning priorities to the job request and the other job requests based on costs of executing the job request and the other job requests in the high-performance computing environment.

8. A device, comprising:
one or more memories; and
one or more processors, communicatively coupled to the one or more memories, configured to:
receive a job request that requests performance of one or more operations by resources of a high-performance computing environment;
process the job request, with a policy execution model, to identify one or more policies to apply during execution of the job request in the high-performance computing environment,
wherein the policy execution model is trained based on policy parameters;
process the job request, with a forecast object model, to generate a forecast of resources and licenses required from the high-performance computing environment,
wherein the forecast object model is trained based on:
job data that identifies data associated with executing jobs by the high-performance computing environment,
wherein the job data includes data identifying one or more of:
an optimization entity object that defines the resources and the licenses of the high-performance computing environment, or
one or more job roadmaps that represent milestones for desired outputs of jobs, and
profile data that identifies a historical profile associated with the high-performance computing environment;
process the job request, other job requests, the one or more policies, and the forecast, with a first model, to determine a schedule for the job request;
process the schedule and current constraints on the resources and the licenses of the high-performance computing environment, with a second model, to determine an optimized schedule for the job request relative to the schedule; and
perform one or more actions based on the optimized schedule.

9. The device of claim 8, wherein the one or more processors, when processing the schedule and the current constraints on the resources and the licenses of the high-performance computing environment, with the second model, to determine the optimized schedule, are configured to:
calculate changes to the current constraints on the resources of the high-performance computing environment;
calculate changes to the current constraints on the licenses of the high-performance computing environment; and determine the optimized schedule based on the changes to the current constraints on the resources and the changes to the current constraints on the licenses.

10. The device of claim 8, wherein the optimized schedule for the job request maximizes a throughput per cost metric for the job request and for each of the other job requests.

11. The device of claim 8, wherein the policy parameters include one or more of:
one or more criteria classifiers to apply for optimization rules;
one or more permissible values of the one or more criteria classifiers;
one or more rule classifiers that classify rules to apply to jobs;
one or more job properties to define which of the rules to apply to each of the jobs; or
one or more job criteria rules.

12. The device of claim 8, wherein the profile data includes data identifying one or more of:
historical resource consumption by the resources of the high-performance computing environment,
historical license consumption by the licenses of the high-performance computing environment,
historical rules utilized by the high-performance computing environment, or
historical properties associated with the resources and the licenses of the high-performance computing environment.

13. The device of claim 8, wherein the one or more policies and the forecast ensure that the optimized schedule for the job request maximizes a throughput per cost metric for the job request and for each of the other job requests and satisfies objectives of the job request and of each of the other job requests.

14. The device of claim 8, wherein the one or more processors, to process the job request, the other job requests, the one or more of the policies, and the forecast, with the first model, to determine the schedule, are configured to:
determine job profiles for the job request and the other job requests based on the profile data,
apply a defined scaling factor to the job profiles to generate scaled job profiles, and
determine the schedule based on the generated scaled job profiles.

15. A non-transitory computer-readable medium storing instructions, the instructions comprising:
one or more instructions that, when executed by one or more processors, cause the one or more processors to:
train a policy execution model with policy parameters to generate a trained policy execution model and to generate policies for the trained policy execution model;
train a forecast object model with job data and profile data to generate a trained forecast object model,
wherein the job data identifies data associated with executing jobs by a high-performance computing environment, and
wherein the job data includes data identifying one or more of:
an optimization entity object that defines resources and licenses of the high-performance computing environment, or
one or more job roadmaps that represent milestones for desired outputs of jobs, and
wherein the profile data identifies a historical profile associated with the high-performance computing environment;
receive a job request that requests performance of one or more operations by resources of the high-performance computing environment;
process the job request, with the trained policy execution model, to identify one or more of the policies to apply during execution of the job request in the high-performance computing environment;
process the job request, with the trained forecast object model, to generate a forecast of the resources and the licenses required from the high-performance computing environment;
process the job request, other job requests, the one or more policies, and the forecast, with a heuristic model, to determine a schedule for the job request;
process the schedule and current constraints on the resources and the licenses of the high-performance computing environment, with a linear programming model, to determine an optimized schedule for the job request relative to the schedule; and
perform one or more actions based on the optimized schedule.

16. The non-transitory computer-readable medium of claim 15, wherein the one or more instructions, that cause the one or more processors to perform the one or more actions, cause the one or more processors to one or more of:
provide, to a client device, information identifying the optimized schedule;
cause the optimized schedule and the one or more of the policies to be implemented by a job scheduler and a license manager of the high-performance computing environment;
provide, to a client device, information identifying a throughput and a cost of the optimized schedule;
cause another schedule of another job request to be modified based on the optimized schedule;
cause an order to be placed for one or more additional resources, for the high-performance computing environment, based on the optimized schedule; or
retrain one or more of the policy execution model, the forecast object model, the heuristic model, or the linear programming model based on the optimized schedule.

17. The non-transitory computer-readable medium of claim 15, wherein the one or more instructions, that cause the one or more processors to process the job request, the other job requests, the one or more of the policies, and the forecast, with the heuristic model, to determine the schedule, cause the one or more processors to:
determine job profiles for the job request and the other job requests based on the profile data;
apply a defined scaling factor to the job profiles to generate scaled job profiles;
assign one or more resources of the high-performance computing environment to the job request and to each of the other job requests based on the scaled job profiles;
prioritize the job request and the other job requests based on products or costs associated with the job request and the other job requests;
reassign the one or more resources of the high-performance computing environment to the job request and to each of the other job requests based on prioritizing the job request and the other job requests; and
determine the schedule for the job request based on reassigning the one or more resources of the high-performance computing environment.

18. The non-transitory computer-readable medium of claim 17, wherein the one or more instructions, that cause the one or more processors to prioritize the job request and the other job requests based on the products or the costs associated with the job request and the other job requests, cause the one or more processors to:
- prioritize the job request and the other job requests by assigning higher priorities to particular products associated with the job request or one or more of the other job requests; or
- prioritize the job request and the other job requests by assigning priorities to the job request and the other job requests based on costs of executing the job request and the other job requests in the high-performance computing environment.

19. The non-transitory computer-readable medium of claim 15, wherein the one or more instructions, that cause the one or more processors to process the schedule and the current constraints on the resources and the licenses of the high-performance computing environment, with the linear programming model, to determine the optimized schedule, cause the one or more processors to:
- calculate changes to the current constraints on the resources of the high-performance computing environment;
- calculate changes to the current constraints on the licenses of the high-performance computing environment; and
- determine the optimized schedule based on the changes to the current constraints on the resources and the changes to the current constraints on the licenses.

20. The non-transitory computer-readable medium of claim 15, wherein the optimized schedule for the job request maximizes a throughput per cost metric for the job request and for each of the other job requests.

* * * * *